Patented Aug. 7, 1951

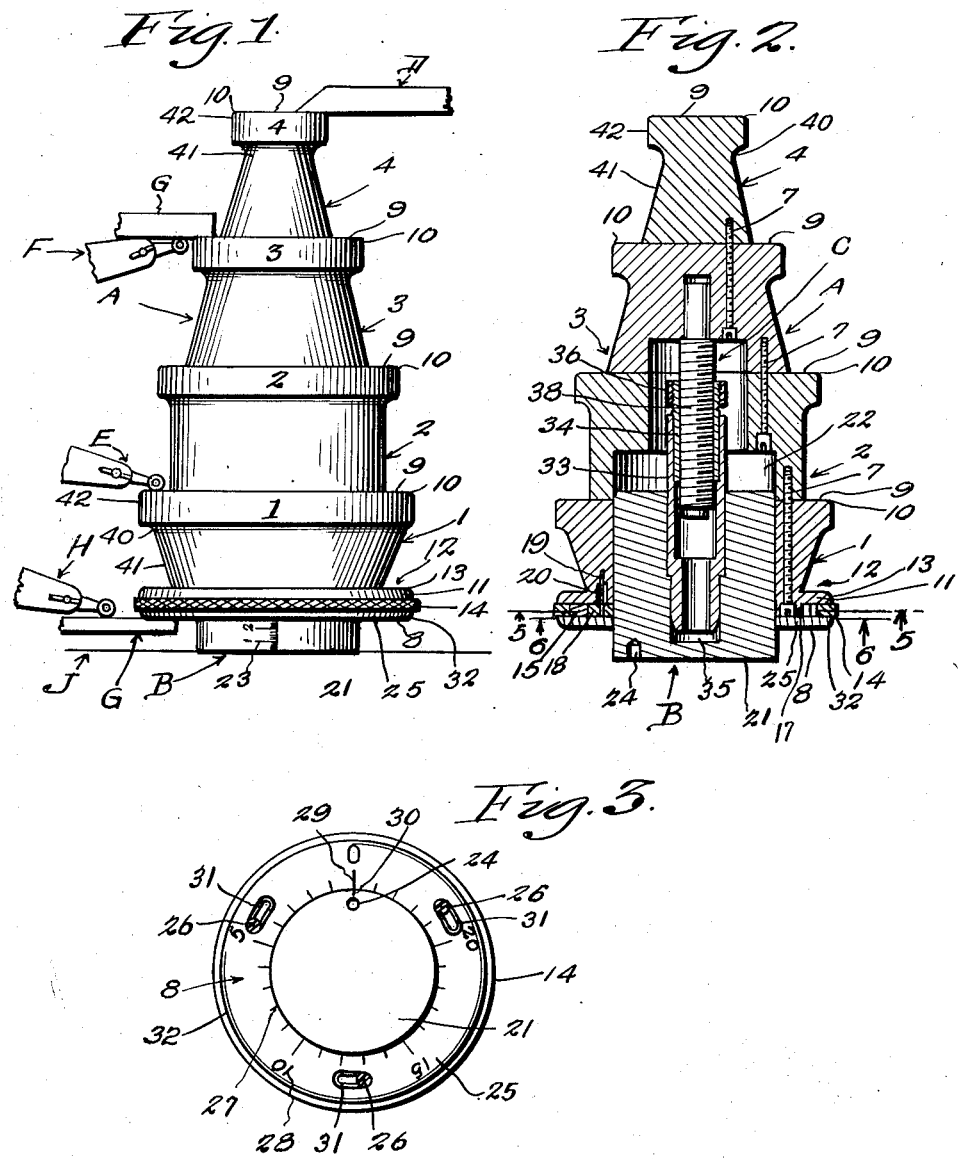

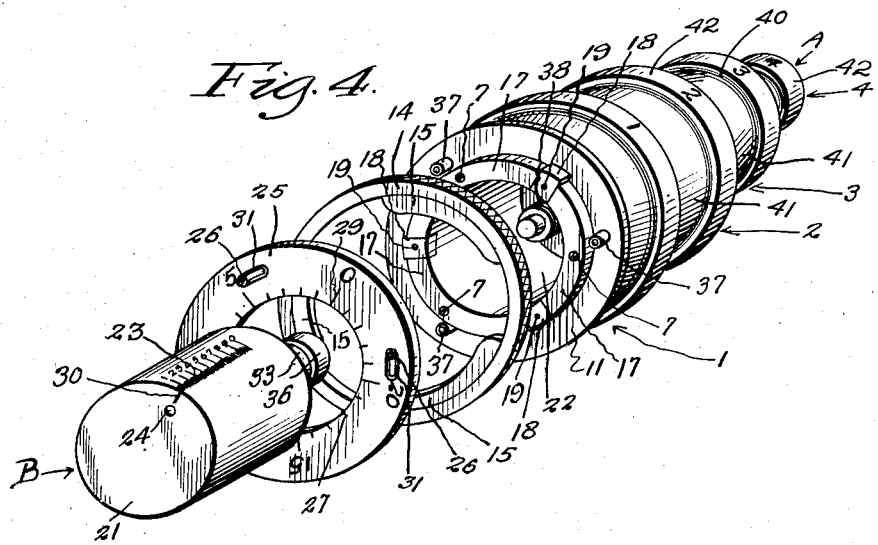

2,562,935

UNITED STATES PATENT OFFICE 2,562,935

PRECISION SETTING INDICATING AND SCRIBING INSTRUMENT FOR USE IN CONNECTION WITH HEIGHT GAUGES

Jack S. Minch, Brooklyn, N. Y.

Application January 30, 1946, Serial No. 644,226

13 Claims. (Cl. 33—170)

This instrument relates to a novel precision instrument designed and adapted for setting comparators, indicators or markers on height gauges and the like, quickly and accurately, and adaptable for indicating heights, and also aptly adaptable for precision scribing.

The setting of comparators, indicators and markers, indicating heights and scribing are procedures and practices necessary in machine shops, in tool and die making, in inspection work and elsewhere.

Basically the instrument consists of a multiple step equipped main body, a projectable and retractible base, a micro-meter-like screw thread movement, a zero adjustment ring and a clamping ring.

Briefly stated, the embodiment of the instrument comprises a main body, characterized by a stack or column of gauge blocks, the main body having step or measuring surfaces located in parallel planes and spaced apart in major units of a system of measurement, the bottom surface of the main body having attached thereon a zero adjustment ring which forms a relatively fixed base for the main body, the lower portion of the main body being provided with an axial socket, having located therein a projectable and retractible base, said main body and base being connected by a micro-meter-like screw thread movement. Suitable indications and scales are provided on the zero adjustment ring and movable base, making it possible to register settings of the steps on the main body in relationship to the bottom surface of the movable base in increments of the major units of the system of measurement used for the steps. A clamping ring with cams attached and coacting dogs or friction detents is located in the space provided between the bottom of the main body and the zero adjustment ring, making it possible to lock the settings.

An object of the invention is to provide body means, or a column, as it is often called, in which the steps or shoulders are made up of precision made independent parts, these being "stacked" one upon the other and assembled and fastened together by tie-down screws, this form of body means being preferable over a one-piece body in that the individual parts may be more adequately and satisfactorily machined for accuracy.

Another object has to do with the adoption and use of a manually operated and readily accessible clamping ring, this being incorporated between a zero adjustment ring, to be hereinafter described, and the lower section or unit of the sectional body, and being provided with cam actuated grips or detents, the latter serving to grip the projectable and retractable base in a manner to lock and retain a predetermined setting.

Another object of the invention appertains to the provision of a sectional body and complemental projectable and retractable base, these being connected together by coacting screw threaded members embodying take-up means provided to compensate for wear of the threads as the instrument is used.

Another object of the invention is to provide an instrument of the above type wherein the stated zero adjustment ring is provided on the bottom of the body means, said ring coacting with the bottom surface of the base in a particular manner to be hereinafter described.

Another object of the invention is to provide the projectable and retractable calibrated base with a socket to accommodate a small crank (not shown) such as is provided for quick turning of the base to change settings, said crank also being used when making inverted settings.

Another object is to provide an instrument in which time is saved and greater accuracy is employed in making height gauge settings, making my instrument a valuable addition to the field of measuring instruments, particularly for layout work and in inspection departments where many settings of height gauges must be made.

It is also an object of the invention to provide a construction in which the settings will be much more accurate due to the fact that the graduations are large and that there is only one adjustable connection employed between the measuring surfaces of the instrument, this being of a precision nature.

It is also submitted that the use of this precision instrument will save well over fifty per cent of the wear on the many parallels, plug gauges, planer gauges and the like, such as are now being used in the practice of building up a predetermined or wanted height.

Then too, the instrument herein shown and hereinafter particularly described is such as to enable point to point checking to be accomplished by transferring heights from the work to this instrument. The readings thus obtained are used to compute for new settings of the instrument which are used, for example, in resetting a dial test indicator or a marker from the instrument.

Referring now to the drawings, wherein like letters and numerals are employed to designate like parts throughout the views:

Figure 1 is an elevational view of a precision instrument, a setting and indicating device for height gauges and the like, constructed in accordance with the principles of the instant invention.

Figure 2 is a central vertical sectional view, with parts in elevation, throughout the same.

Figure 3 is a bottom plan view, showing the projectable and retractable base retracted to assume the same plane as the zero adjustment ring.

Figure 4 is a perspective view, of a partially exploded type, to illustrate and bring out the construction, arrangement, and association of certain of the parts.

Figures 5 and 6 are similar cross-sectional views taken on the planes of the lines 5—5 and 6—6 respectively, of Figure 2.

By way of introduction to the detailed description, I would point out that this instrument consists of a body having a column of steps or shoulders spaced one-inch apart. In the bottom of the body is a movable base which is adjustably connected to said body by a micrometer screw having forty-threads per inch. Suitable graduations on the body and the movable base make it possible to set the latter base relative to the fixed base and stated steps in increments of a thousandth part of an inch.

A clamping ring is provided for locking the desired setting. This ring functions by actuating a series of detents.

A take-up ring on the micrometer adjusting screw is used for compensating for wear of the threads on said screw.

Prevision has been made for adjustment of the zero position of the instrument.

A crank is provided for quickly projecting and retracting the movable base to change settings. This crank is also used when making inverted settings.

By using a supplementary height block (not shown), the range of my instrument may be increased.

The time and accuracy factors involved in making height gage settings makes this instrument a valuable addition to the field of measuring instruments, particularly for lay-out work and in inspection departments, where countless settings of the height gages must be made.

The settings will be much more accurate since the graduations are large and there is no compensating necessary as for under-size parallels and nearest size plug gage to figure wanted.

It is contemplated that the use of this instrument will save well over 50% of the wear on the many parallels, plug gages, planer gages, etc., now being used in the phychopathic method of building up a wanted height.

Generally and briefly my novel measuring instrument is characterized by a multiple unit or sectional frusto-conical body A, a projectable and retractable base B slidably mounted in said body, screw threaded micrometer adjusting means C between the body A and base B for actuating said body and base in axially extensible relation, one to the other, a suitable scale and dial for registering settings, a clamping ring for locking settings, and a zero adjustment ring for calibration of the zero position of the instrument.

The sectional frusto-conical body A comprises, as before indicated, a plurality of companion sections or intact units 1, 2, 3 and 4, defining steps. These units, which are pre-made, are arranged in superposed or stacked relationship, as shown in Figure 2, and are assembled and secured together by individual tie-down screws 7. The steps or measuring surfaces on said units are numbered, and thus easily identifiable, by having inscribed thereon, at suitable points, the ordinals 1, 2, 3 and 4. These ordinals represent inch heights or distances between the fixed base surface 8 and the landing surfaces or steps 9 of each unit, and are for quick identification purposes. The outer marginal edges of said units are rounded off, as at 10, to provide lead surfaces or edges, these for accommodation of an indicator tip. An outstanding annular flange 11 on the lowermost unit 1 provides, as at 12, a fractional or "intermediate" step, the distance of this being .250 inch above the contact or base surface 8, the perimeter of said flange 11 being rounded off as at 13. At this stage, attention is directed to Figure 4, in which it will be seen that the numeral 14 designates a marginally knurled clamping ring. This is provided on its inner peripheral edge with circumferentially spaced equidistant cams 15, secured by pins 16 or otherwise fastened in place, as shown for example in Figure 5. The clamping ring 14 and the cams carried thereby surround a ring-like adapter device made up of segmental or sector-shaped members 17. These members are spaced apart to accommodate radially projectable and retractable friction clamping blocks 18. There are three blocks and each block forms a friction detent, each block being held clear of the movable or variable base B by a spring 19 when the instrument is being adjusted for a setting. An accommodation and clearance recess 20 is provided for each spring 19 to allow space for bending, as shown in Figure 2. The variable and "movable" base B is a cylindrical block or plug 21 which slides "in" and "out" in a socket 22 provided in the sectional body A. As seen, this block is provided with a graduated measuring scale as at 23 (see Figures 1 and 4). Also, the block is provided with a crank accommodation socket 24 (see Figures 2, 3 and 4). The knurled surface of the clamping ring 14 projects beyond the outer marginal perimeter of the flange 11 where it may be conveniently grasped when it is desired to lock base B in a predetermined set position. Turning the clamping ring in one direction forces the cams 15 against the detent blocks 18 which forces the detent blocks in against the surface of the cylindrical block 21 and against the tension of the springs 19. Thus, the base B is locked securely to hold the setting without having exerted any rotary force that would accidentally change the setting.

Calibration of the instrument's zero position is provided for by the zero adjustment ring or annulus 25. The latter is fastened in place by retaining or adjustment ring screws 26, as shown in Figure 3. The inner peripheral edge of said ring is provided with a circular graduated scale as at 27, being denoted at each fifth graduation as at 28 and ranging from "zero" to "25." The zero index line 29 on said ring coacts with an index line 30 which forms the base line for the scale 23 and extends for a short distance on the bottom surface of the projectable and retractable base or block B. It so happens that said index line 30 is in alignment with the aforementioned crank accommodation socket 24, though this is not absolutely necessary. The ring 25 is provided with marginally recessed slots 31. These slots serve to permit the ring 25 to be shifted in order to bring the zero line 29 into exact alignment with the index line 30. Thus, the body A is provided with a fixed base or contact surface which is the graduated adjustable zero ring 25 coacting with the graduated scale 23 and the index line 30 on the movable or variable base B to provide a means of registering the micrometer like settings of the distant relationship of surfaces 8, 9 and 12 to the bottom surface of the movable base B. The marginal corner of the ring 25 is rounded off as at 32.

The micrometer adjustment means for locating the base B in relation to the body A comprises any suitable screw threaded arrangement. Thus, as indicated broadly at C, comprises a sleeve 33 internally screw threaded by way of an insert 34 and having a reduced lower end fitting tightly into a socket 35 in the cylindrical block 21. Insert 34 is provided with a nut 36 which acts as a take-up device to compensate for wear of the screw threads.

Spacers 37 are provided to prevent the screws 26 from drawing the zero adjustment ring 25 against the clamping ring 14, thus leaving the clamping ring free to be turned.

Coacting with the screw threaded sleeve is an adjusting or feed screw 38 (see Figure 2) which has adjustable threaded connection with sleeve 33; said screw being carried by the section 3 of the body A. Or to put it otherwise, the screw 38 is carried by the body A and the threaded sleeve 33 by the projectable and retractable base B, thus making it possible to turn one part in relation to the other, axially speaking, in order to translate this rotary movement or motion into reciprocatory motion for the respective parts.

In Figure 1, we see a marker D (such as is provided on a height gauge), said marker D being set at a 4.300 inch height. Then, at the left in Figure 1, shown fragmentarily of course, we see an indicator E being set at a 1.300 inch height. Also at the left in Figure 1, we see an indicator F being set at a 3.300 inch height for an inverted setting by the use of a flat extension piece G. These measurements are obtained from the top surface of a flat plate on which the base is set, for example, a datum plane or equivalent surface J.

The underside of the zero adjustment ring, that is the surface 8, can of course be used, this to accommodate an extension piece G so as to provide a surface for an indicator tip H, the indicator being set at a .300 inch height above the datum plane J. Also, the top surface of the flange 11, as indicated at 12, can be used as an in-between or "intermediate" step, that is the auxiliary step below the first or No. 1 step seen in Figure 1. This intermediate step provides a means whereby much turning of the base B may be eliminated by adding its .250 inch height from the surface 8 to settings that range from .250 inch to one inch. In this instance a height of .550 inch could be obtained from surface 12 without any further adjustment of the movable base B.

Although the description and drawings describe and show an instrument which has been graduated for the English system of measurements, it will be understood that some other system of calibrations may, of course, be employed. For example, by changing the graduations, numerals and coacting threads, the instrument may be adopted for use with the metric or any other system of measurement. Also, by the addition of more graduations, the instrument may be made with fine measurements of units graduated say in ten thousandths.

I would stress too, the fact of the rounded edges of the units which are important in that they provide a lead for indicator tips which are often knocked against a square edged surface, thus changing, undesirably of course, an expected reading. Furthermore, it will be worthwhile to keep in mind the close fit of the body A on the base B. This is important as it insures accuracy of the setting by eliminating any side motion of the coacting threads C and establishes a relative parallel condition between the measuring surfaces of body A and the lower surface of base B.

*Features of the invention*

1. A column of steps or shoulders one inch apart simulating a stack of gauge blocks.
2. Rounded edge on steps to provide a lead for piloting an indicator tip into place.
3. Suitable receptive surfaces on selectively usable steps to accommodate the tip of an indicator, scriber or marker as the case may be.
4. Steps numbered to make measurement readings easy.
5. Base B movable in relation to the ascending series of steps by use of a micrometer-like movement.
6. Close fit of base B to the socketed portions inside of the body A to retain accuracy of the screw thread.
7. Suitable graduations on the base B and the body A to make possible the registering of the movement of the base relative to the body and steps in increments of a thousandth of an inch or less.
8. A socket in the end of a the base B for insertion of a crank for quick setting of the instrument.
9. Low center of gravity of the instrument due to its frusto-conical shape.
10. A clamping ring for locking the setting. This actuates a series of friction detents.
11. Springs for releasing the detents from the base when the clamping ring is in an unlocked position.
12. A zero adjustment ring for calibration of the zero setting of the instrument.
13. A take-up nut for compensating for wear of the screw thread.
14. An intermediate step for speedy adjustment of settings of from .250 inch to one inch.

It will be clear from the foregoing description and drawings that there are certain cardinal phases of the invention which represent what may be identified as significant achievements. For example, it is novel to utilize a frusto-conical body and to make the same of hollowed form so that it functions somewhat like a "thimble" in a micrometer and houses a "micrometer head," that is, the projectable and retractable spindle-like base B and the micrometric operating connection between same and the body. Primarily, however, novelty has to do with a body which is made up of precision machined gauge blocks which are stacked upon each other and concentrically screwed together by individual screws and are made of varying diameters to provide the selectively usable steps, the latter at predetermined distances apart. Also, it will be clear that the frusto-conical body provides an instrument having a light top and heavier bottom thus providing the desired factor of low center of gravity and promotion of stability.

By using the precision made bottom of the body as a base and the retractable and projectable unit B as another base, I have a relatively fixed base on the body and the other base becomes a relatively movable one, the two bases being adjustable in relation to a datum plane (gauging surface J) by way of the micrometric connection between the base B and body A. It is to be noted, in this connection, that the fixed base, the surface 8, provides an extra or auxiliary gauging surface between itself and the fixed surface J.

As previously touched upon it is ingenious in a measuring instrument of the type herein disclosed to rotatably mount a resilient finger ring on the basal portion of a body, whether sectional or not, and to provide the ring with cams to act on radially projectable and retractable detents for frictional engagement with the peripheral surface of base B.

I claim:

1. In a precision instrument of the class described, a body having an axial socket opening through the bottom of said body, a cylindrical micrometer base slidably mounted in said socket, a screw threaded operating connection between the body and base, a finger ring mounted for rotation on the lower portion of said body, and retaining means interposed between the base and ring, said retaining means comprising a plurality of circumferentially spaced radially actuable equidistant detents carried by the body and engageable with the adjacent peripheral surface of the base, and a plurality of cams mounted in said ring and engageable with said detents.

2. In a precision instrument of the class described, a multiple stepped internally socketed body provided on its basal portion with an outstanding horizontal flange, a graduated zero ring fastened adjustably to and spaced from said flange, a finger regulated ring interposed and turnable in the space between the flange and zero ring, radially movable detents slidably mounted on said body, said detents being spring returned, and cams mounted on the inner periphery of said finger ring and operably engageable with said detents.

3. In a precision instrument of the class described, a multiple stepped internally socketed body, provided on its basal portion with an outstanding flange, a graduated zero ring fastened adjustably to said flange, a finger ring interposed between the flange and zero ring, detents mounted on said body, said detents being spring returned, and cams mounted on the inner periphery of said ring and engageable with said detents, together with a cylindrical block-like projectable and retractable base mounted in the socket means in said body and projectable in relation to the surface of said zero ring, and an operating connection between the base and body.

4. In a precision instrument of the class described, a multiple stepped internally socketed body, provided on its basal portion with an outstanding flange, a graduated zero ring fastened adjustably to said flange, a finger ring interposed between the flange and zero ring, detents mounted on said body, said detents being spring returned, and cams mounted on the inner periphery of said ring and engageable with said detents, together with a cylindrical block-like projectable and retractable base mounted in the socket means in said body and projectable in relation to the surface of said zero ring, and an operating connection between the base and body, said zero ring being provided with a graduated scale, and the lower under side of said base being provided with an index coacting with said scale, the scale including a zero marker, and said index being adapted to be lined up with said marker, this to compensate for wear on the bottom surface of said base.

5. In a precision instrument of the class described, a multiple stepped internally socketed body provided on its basal portion with an outstanding horizontal annular flange, a ring detachably mounted on and disposed in spaced parallelism with said flange, detent adapter means interposed between the ring and flange and marginally surrounding a co-acting portion of the socket in said body, radially projectible and retractible detents carried by said adapter means, springs on the body for normally moving the detents radially from the axial dimension of said body, a finger grasped and turnable ring interposed between the flange and said first named ring and surrounding the detents, and cams mounted on the inner peripheral portion of said finger ring and engageable with said detents for operating the latter against the tension of the springs.

6. The structure specified in claim 5, together with an axially projectible and retractible cylindrical base mounted in the socket means in said body, said detents being forced by the cams into frictional contact with coacting surfaces of said base in the manner and for the purposes described.

7. A micrometer-type instrument for measuring distances and expressly machined and precision designed for quickly and accurately setting height gauges, dial indicators, markers, scribers and the like comprising a substantially frusto-conical body having a plurality of outstanding parallel gauging surfaces of varying diameters situated at predetermined distances from each other, having a flat bottom providing a relatively fixed base to rest with requisite accuracy on a stationary surface defining a datum plane, said body being hollowed, said fixed base having a vernier scale, a relatively movable base completely housed in said body and having its bottom flush with the bottom of the relatively fixed base when fully retracted, means micrometrically connecting said movable base with said body so that by turning said movable base in relation to said body, it may be projected beyond the fixed base, said movable base having a "spindle" scale at right angles to and coacting with said vernier scale, said movable base being of a diameter less than the outside diameter of said fixed base.

8. The structure specified in claim 7, wherein the bottom of said fixed base, when said fixed base is elevated by the movable base above the datum plane, serves to provide a low lying gauging surface in close proximity to said datum plane.

9. A precision instrument for measuring distances and expressly designed for setting height gauges, dial indicators, markers, scribers and the like quickly and accurately comprising a base adapted to rest firmly upon a stationary surface usable as a datum plane, a hollowed frusto-conical body fitted telescopically over said base, the bottom of said body being movable toward and from said stationary surface and, when elevated, constituting a gauging surface for setting a gauge or the like, a micrometric operating connection between said body and base for adjusting the base and body in relation to one another, said body being made up of precision made individual pre-sized gauge blocks superimposed one upon the other, said blocks being of predetermined but varying diameters and each of established height to provide a series of selectively usable steps adapted to be oriented and adjusted in relation to said stationary surface and base, a resilient finger actuatable ring rotatably mounted on said body and concentrically surrounding said base, circumferentially spaced equidistant friction detents slidably mounted on said body and movable radially into and out of engagement with said base, and an operating connection between the detents and ring.

10. A precision instrument for measuring distances and expressly designed for setting height gauges, dial indicators, markers, scribers and the like quickly and accurately comprising a substantially frusto-conical body having a plurality of parallel gauging surfaces of varying diameters at predetermined distances from each other and having an axial socket opening through the bottom of said body, a body lifting and lowering base slidably mounted in said socket and flush with said bottom when fully retracted and projectible beyond said bottom, a manually turnable resilient locking ring rotatably mounted on a basal portion of said body and concentrically surrounding said base, and locking means for the base interposed between the latter and said ring embodying a plurality of circumferentially spaced radially actuable spring-released detents frictionally contactable with the peripheral surface of said base, and cams carried by said ring and operatively engageable with said detents.

11. The structure specified in claim 10, the bottom of said body having a precision finished surface constituting a relatively fixed base for said body adapted to rest on when said first named base is fully retracted into said socket, said latter base having a crank accommodating socket in its bottom.

12. In a setting and indicating instrument for height gauges and the like, a step-equipped frusto-conical body having a circular flat bottom constituting a relatively fixed base, said body having a central axially disposed recess forming a socket, a cylindrical plug-type relatively movable base telescopically mounted in said socket, said movable base being wholly retractible into said socket and also projectible downwardly and beyond the bottom of said body and being of a diameter less than the outside diameter of said bottom, an outstanding flange forming a portion of said bottom, and means on the underside of said flange surrounding the peripheral sulfaces of said base and adapted to constitute a measuring surface between the flange and a relatively fixed surface on which the body is adapted to be placed for measuring purposes, and the peripheral surface of said base having a graduated scale co-acting with said means.

13. The structure defined in claim 7, wherein said body is made up of precision made pre-sized individual gauge blocks superimposed and thus stacked one upon the other, each block being of a predetermined diameter, of a diameter different from that of the other blocks and each block being of established height to provide a series of selectively usable steps adapted to be oriented in relation to said stationary surface, at least one assembling screw carried by each, except the uppermost gauge block, all of said screws being eccentric to and parallel with the central vertical axis of the body and having their head portions conveniently and handily accessible for selective application and removal, and all of said gauge blocks having screw-threaded sockets, said sockets being in alignment with their respective complemental screws, and said screws being screwed into their co-acting sockets, whereby to permit said blocks to be systematically assembled, dismantled and repaired or, if need be, wholly removed and replaced.

JACK S. MINCH.

REFERENCES CITED

The following references are of record in the file of this patent:

UNITED STATES PATENTS

| Number | Name | Date |
|---|---|---|
| 873,626 | Starrett et al. | Dec. 10, 1907 |
| 1,472,837 | Hoke | Nov. 6, 1923 |
| 2,104,194 | Glouton | Jan. 4, 1938 |
| 2,135,316 | Whistler | Nov. 1, 1938 |
| 2,247,797 | Anderson | July 1, 1941 |
| 2,345,591 | Frederick | Apr. 4, 1944 |
| 2,350,881 | Dickerman | June 6, 1944 |

OTHER REFERENCES

Publication: American Machinist Mag., March 29, 1945 (page 135).